(12) United States Patent
Kao

(10) Patent No.: US 6,762,864 B2
(45) Date of Patent: Jul. 13, 2004

(54) APPARATUS FOR HOLDING A CONTACT IMAGE SENSOR IN A SCANNING SYSTEM

(75) Inventor: Will Kao, Hsin-Chu (TW)

(73) Assignee: Mustek Systems Inc. (TW)

( * ) Notice: Subject to any disclaimer, the term of this patent is extended or adjusted under 35 U.S.C. 154(b) by 607 days.

(21) Appl. No.: 09/785,238

(22) Filed: Feb. 20, 2001

(65) Prior Publication Data

US 2002/0114023 A1 Aug. 22, 2002

(51) Int. Cl.⁷ ................................................ H04N 1/04
(52) U.S. Cl. ...................... 358/497; 358/358; 358/483; 358/474
(58) Field of Search ................................ 358/497, 494, 358/474, 471, 487, 505, 506, 475, 509, 483, 482, 514, 512, 513, 400, 500; 250/208.1, 234–236, 239; 399/211; 382/312, 318, 319; 359/210, 212, 205

(56) References Cited

U.S. PATENT DOCUMENTS 5,999,277 A * 12/1999 Tsai ............................ 358/497
6,137,106 A * 10/2000 Kao ............................ 250/239
6,424,435 B1 * 7/2002 Kao ............................ 358/497

* cited by examiner

Primary Examiner—Cheukfan Lee
(74) Attorney, Agent, or Firm—Lowe Hauptman Gilman & Berner, LLP

(57) ABSTRACT

An apparatus for holding a contact image sensor of a scanning system includes a supporting shaft and an elastic element. The supporting shaft is set through a holder and contact the contact image sensor. The elastic element contains a spring. The spring is positioned outside the holder and provides a force to the supporting shaft for pushing the contact image sensor upwardly. In this case, the contact image sensor stays close to a document plate to conduct scanning processes. Since the spring is outside the holder, the variation of holder due to manufacturing would not affect the force from the spring. Thus balanced forces are generated by the springs, further avoiding the situation of the contact image sensor jammed during scanning processes.

2 Claims, 3 Drawing Sheets

APPARATUS FOR HOLDING A CONTACT IMAGE SENSOR IN A SCANNING SYSTEM

BACKGROUND OF THE INVENTION

1. Field of the Invention

The present invention generally relates to a CIS (Contact Image Sensor) holder for providing a balanced elastic force to ensure CIS being adjacent to a scanning plate and maintaining a fixed depth of scanning field.

2. Background Description

Scanning devices have been broadly employed to input images. Especially when the personal computer is popular, the scanning device is able to scan a document and thus transform to a digitalized image format. Users can therefore edit, make copies and/or store in a storage device.

Prior known scanning device 1 is shown in FIG. 1. The scanning device 1 includes a body 12, a cover 14, a scanning module 10, a driving rod 18 and a document plate 16. The scanning module 10 is positioned below the document plate 16 and coupled with the driving rod 18. The scanning module 10 is able to move along the driving rod 18. According to the operation of the prior known scanning device, firstly, a document (not shown in the Figures) is placed on the document plate 16. When the cover is closed, the scanning module 10 is driven along the driving rod 18 to the arrow direction. The scanning module 10 is therefore capturing the image of the document and generating digitalized signals.

However, the prior known scanning device is not suitable to the present marketing needs. Users hopes the functions can be enhanced and the size of a scanning device can be minimized dramatically. Thus, a portable scanning device with no functions loss is needed. A minimized portable scanning device can work with a portable notebook to scan documents anywhere and everywhere. In this regard, designers would prefer employing small size Contact Image Sensor (CIS) instead of large size Charged Couple Device (CCD). By employing CIS as a major element, the size of scanning device is able to reduced to acceptable standard. However, since the depth of scanning field of CIS is far short than the depth of scanning field of CCD. If the CIS is unable to closely adjacent to the document plate, the quality of captured images by CIS is not accepted. Therefore, it is very important and causing a big problem to make sure CIS closely adjacent the document plate and moving smoothly.

Regarding the above mentioned problem, there is a known solution. Please see FIG. 2. FIG. 2 shows a cross section of a CIS holding device. The CIS holding device 20 includes a holder 201 and springs 202. The holder 201 contains an opening for receiving CIS 21. The springs 202 are positioned between the CIS 21 and the holder 201 for proving elastic forces to the bottom of CIS 21. By the forces, CIS 21 is able to closely contact upwardly the document plate 16. For an alternative design, there is able to set sliding assistants 210 for reducing friction between the CIS 21 and document plate 16. In this case, the CIS is able to move smoothly when driven by a driving module.

Nevertheless, in the above known solution, since springs are set between the document plate and CIS, it would cause CIS getting jammed if the springs provide unequal forces to CIS. Such situation occurs when the opening of the holder is not projected (produced) balanced that the springs are not compressed equally. In this case, the CIS 21 would get stuck with the document plate, due to elastic forces are not balanced to pus the CIS 21.

SUMMARY OF THE INVENTION

It is therefore an object of the present invention to provide an apparatus for holding a CIS closely adjacent to the bottom of a document plate. Thus during scanning processes, the CIS is able to maintain a fixed depth of scanning field.

It is therefore another object of the present invention to provide an apparatus for holding a CIS smoothly movable along the document plate, and avoiding the CIS jammed due to manufacturing differences of CIS holders.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
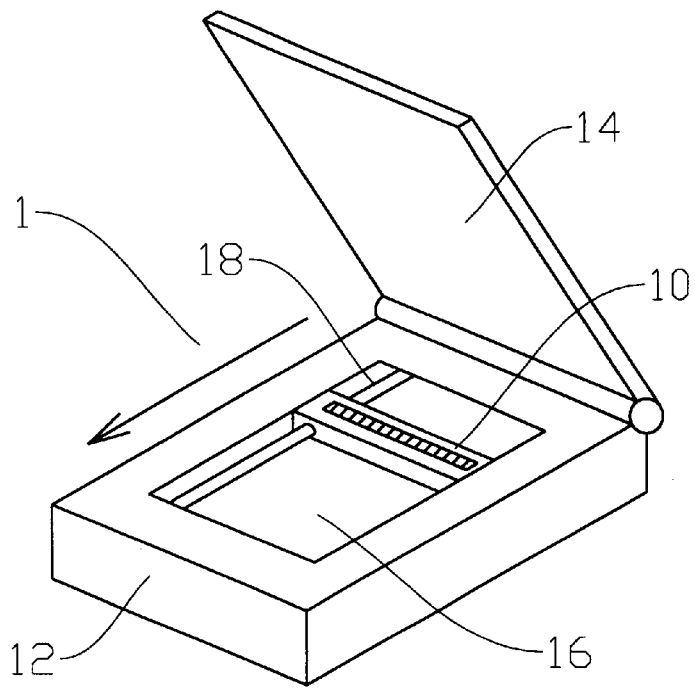
FIG. 1 is a schematic demonstration of a traditional scanning device.
Figure 2:
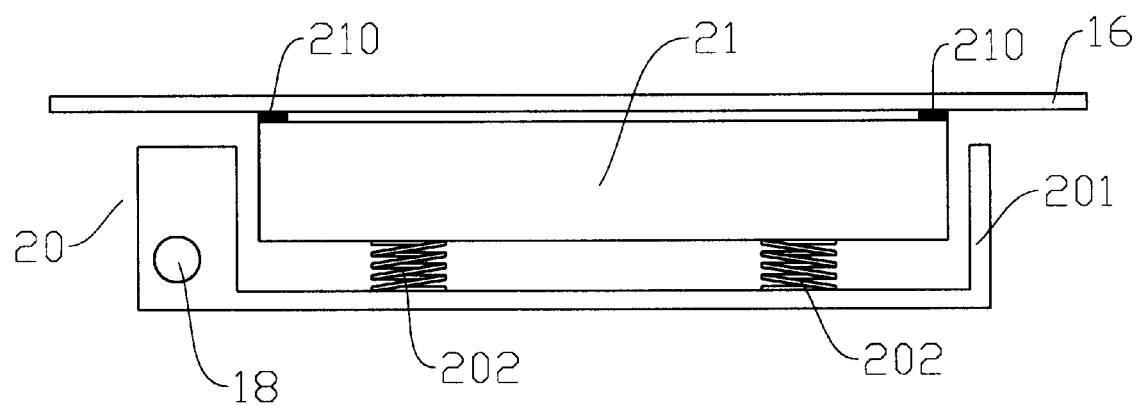
FIG. 2 shows the cross section of a prior known CIS holding device.
Figure 3:
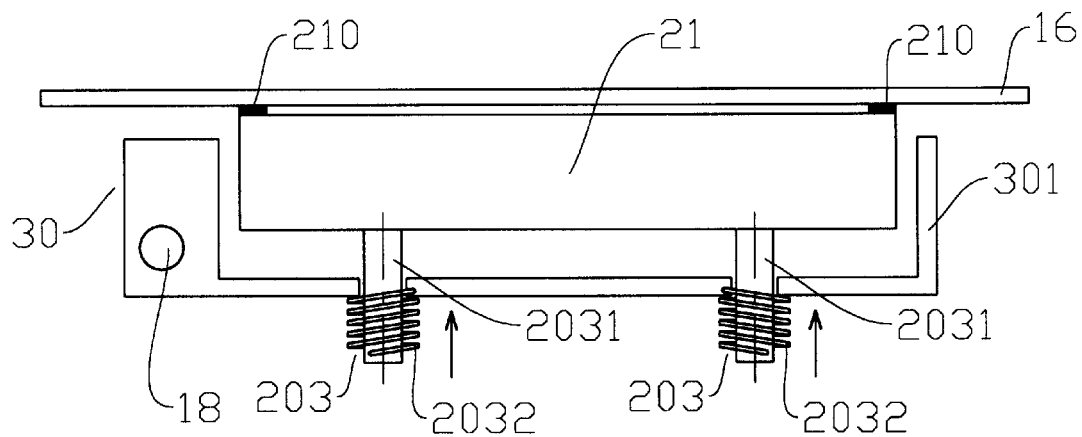
FIG. 3 shows the cross section of the first embodiment of the present invention.

Please refer to FIG. 3. FIG. 3 shows the cross section of the first embodiment of CIS holding device of the present invention. The CIS holding device 30 includes a holder 301 and a elastic device 203. The holder 301 contains an opening for receiving the CIS 21. The elastic device 203 includes at least a supporting shafts 2031 and springs 2032. The supporting shaft 2031 is set through and beneath the holder 301. The supporting shaft 2031 further contacts the CIS 21 for supporting the CIS 21. One port of the spring 2031 is connected to supporting shaft 2031. The opposite port of the spring 2031 is mounted on the holder 301. In this case, the spring 2032 is able to provide a recovering force to the CIS 21 upwardly, shown as the arrow direction. By the recovering force, CIS 21 is thus able to close the document plate 16. When the CIS holding device 30 is driven along the driving rod 18 to capture the image of document, CIS 21 can stay close to bottom surface of the document plate 16 since CIS is supported by the elastic device 203. Thus a fixed depth of scanning field is maintained.

In order to move CIS 21 smoothly, there are set two sliding assistants, such as pads, between the CIS 21 and the document plate 16 to reduce friction. An alternative design is to place two sets of rollers to achieve the purpose of smooth movement of CIS 21 (not shown in the Figures).

In view of the above, since the supporting shaft 2031 is though the holder 301 and contacts the CIS 21, and the spring 2032 is positioned outside of holder 301, the inside surface of the opening of the holder 301 will not affect the elastic forces generated by springs. In this case, CIS 21 can obtain balanced forces from the springs to stay close to the document plate.

Figure 4:
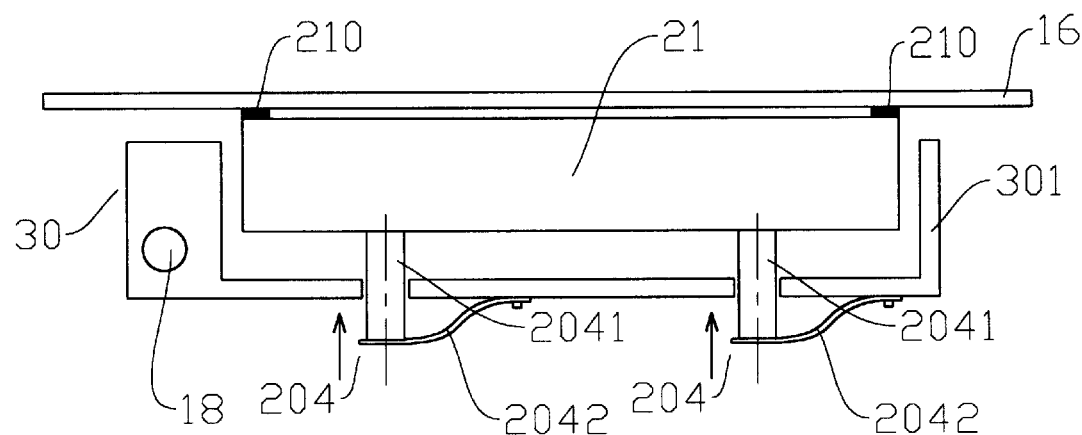
FIG. 4 shows the cross section of the second embodiment of the present invention.

In view of FIG. 4, there is shown the cross section of the second embodiment of CIS holding device of the present invention. The difference between the first and the second embodiments is the recovering forces to the supporting shafts 2041 are generated from elastic clips 2042. One port of the clip 2042 is connected to the bottom of the supporting shaft 2041. Another port of the clip 2042 is mounted on the holder 301. In this case, the clips 2042 are able to provide recovering force to CIS 21 upwardly through the supporting shaft 2041. Thus, the CIS 21 is able to stay close to the document plate 16 and maintain fixed depth of scanning field.

Figure 5:
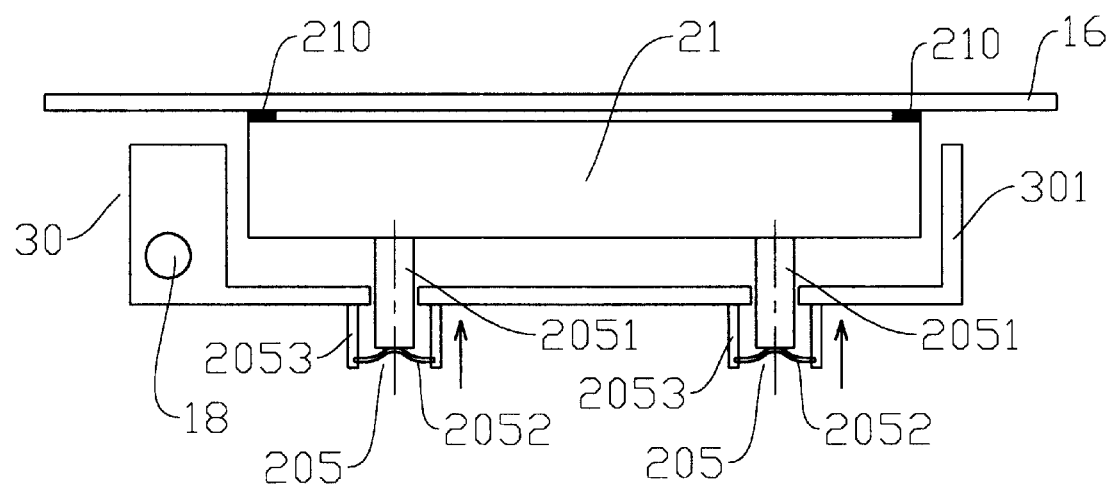
FIG. 5 shows the cross section of the third embodiment of the present invention.

FIG. 5 shows the third embodiment of the present invention. The difference, comparing to the first and the second embodiments, of the third embodiment is that clips 2052 are mounted on clip stands 2053. By the supports of stands 2053, clips 2052 are able to provide forces to supporting shafts 2051 to enforce CIS 21 upwardly. In this case, the CIS 21 can stay close to document plate 16 and also maintain fixed depth of scanning field. Thus, the third embodiment achieves the same purpose and object as the first and the second embodiments do. Furthermore, the stands are also able to be employed as mounting stands for springs.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A contact image sensor holding device for receiving a contact image sensor to stay close to a document plate in order to maintain a fixed depth of scanning field, comprising:

a holder having an opening; and an elastic device, positioned outside said holder, for providing a force to said contact image sensor to be closely adjacent to said document, having:
a supporting shaft positioned through said holder for supporting said contact image sensor; and
an elastic element connected to said supporting shaft for providing said force thereto in order to support said contact image sensor for maintaining said fixed depth of scanning field, wherein one port of said elastic element is connected to said supporting shaft, another port of said elastic element is connected to said holder.

2. The contact image sensor holding device of claim 1, wherein said elastic element is a clip.

* * * * *